United States Patent [19]

Abe et al.

[11] Patent Number: 4,929,675
[45] Date of Patent: May 29, 1990

[54] THERMOPLASTIC RESIN COMPOSITION

[75] Inventors: Hiroomi Abe; Taichi Nishio; Yasurou Suzuki; Takashi Sanada; Mitsuji Tsuji, all of Chiba, Japan

[73] Assignee: Sumitomo Chemical Company, Ltd., Osaka, Japan

[21] Appl. No.: 203,775

[22] Filed: Jun. 7, 1988

[30] Foreign Application Priority Data

Jun. 12, 1987 [JP] Japan ................................. 62-147349

[51] Int. Cl.$^5$ .......................... C08L 53/02; C08L 77/06
[52] U.S. Cl. .......................................... 525/66; 525/68; 525/152; 525/397; 525/905
[58] Field of Search ............................. 525/66, 905, 68

[56] References Cited

U.S. PATENT DOCUMENTS 4,315,086  2/1982  Ueno et al. .

FOREIGN PATENT DOCUMENTS 0046040  2/1982  European Pat. Off. .
164767  12/1985  European Pat. Off. .
182163   5/1986  European Pat. Off. .
56-47432  4/1981  Japan .
56-49753  5/1981  Japan .
59-59724  4/1984  Japan .
60-11966  3/1985  Japan .
61-120855 6/1986  Japan .
61-204261 9/1986  Japan .
61-296061 12/1986 Japan .
62-81449  4/1987  Japan .

Primary Examiner—Jacob Ziegler
Attorney, Agent, or Firm—Cushman, Darby & Cushman

[57] ABSTRACT

A thermoplastic resin composition which comprises 100 parts by weight of a composition (A) which comprises 5–95% by weight of a polyphenylene ether resin and 95–5% by weight of a polyamide, 5–50 parts by weight of a modified rubber-like material (B) wherein 5–100 parts by weight of an aromatic vinyl compound is graft-polymerized with 100 parts by weight of a rubber-like material, the grafting ratio of the aromatic vinyl compound being 50% by weight or more, and 0.05–20 parts by weight of an $\alpha,\beta$-unsaturated carboxylic acid or its derivative (C).

8 Claims, No Drawings

THERMOPLASTIC RESIN COMPOSITION

This invention relates to a novel thermoplastic resin composition which can be made into shaped articles, sheets, films, etc. by injection molding, extrusion molding etc.

More particularly, it relates to a resin composition which comprise a composition comprising a polyphenylene ether and a polyamide, a modified rubber-like material wherein an aromatic vinyl compound is graftpolymerized with a rubber-like material, and α, β-unsaturated carboxylic acid or its derivative. The resin composition is excellent in heat resistance, mechanical properties, processability and solvent resistance.

Polyphenylene ether resin is a thermoplastic resin which is excellent in various properties such as mechanical property, heat resistance, low-temperature resistance, and dimension stability. However, polyphenylene ether itself is inferior in impact resistance and solvent resistance and also inferior in processability due to its high melt viscosity.

On the other hand, polyamide resin is a thermoplastic resin which is excellent in mechanical property, solvent resistance, processability and the like, but inferior in such properties as impact resistance, heat resistance and, in particular, dimension stability due to its high water absorption.

Various composite materials comprising a blend of these two resins have been proposed in order to complement one disadvantage with another advantage.

Japanese Patent Publication (Kokoku) No. 60-11966, Japanese Patent Publication (Kokai) No. 56-47432 and Japanese Patent Publication (Kokai) No. 56-49753 disclose such composite materials. Each of these materials is improved in some points, but still does not have enough impact resistance.

Japanese Patent Publication (Kokai) No. 61-120855 discloses a polyphenylene ether/polyamide composition which contains silane derivatives. However, the composition still does not have enough impact resistance.

Japanese Patent Publication (Kokai) No. 61-296061 suggests a polyphenylene ether/polyamide composition which contains oxidized polyethylene wax as the third component. The composition still does not have impact strength enough to be applied to a wide range of practical use.

Japanese Patent Publication (Kokai) No. 62-81449 discloses a composition which is resistant to both solvent and impact. However, the composition does not have a good balance between impact resistance and flexural modulus.

Japanese Patent Publication (Kokai) No. 61-204261 states that an impact-resistant resinoua composition is obtained by blending a polyphenylene ether/ polyamide composition with a copolymer consisting of a styrene compound and an α, β-unsaturated carboxylic acid anhydride and a styrene elastomer. However, when this composition is molded, foaming often occurs, which is considered to be caused by degradation of dicarboxylic acid anhydride, and thereby appearance is deteriorated.

It is an object of the present invention to provide a polyphenylene/polyamide composition which is excellent in impact resistance, particularly impact strength at room or low temperature, heat resistance and flexural modulus.

As a result of the inventor's wide-ranging and intensive researches and investigations on improvement of resin compositions comprising a polyphenylene ether, a polyamide and a rubber-like material, it has been found that a resin composition which has remarkably improved impact resistance and improved heat resistance and flexural modulus, is obtained by employing as a rubber-like material a specific amount of a modified rubber-like material wherein an aromatic vinyl compound is graftpolymerized with a rubber-like material, and mixing a specific amount of α, β-unsaturated carboxylic acid or its derivative with the composition.

That is, this invention relates to a thermoplastic resin composition comprising 100 parts by weight of a composition (A) which comprises 5–95% by weight of a polyphenylene ether resin and 95–5% by weight of a polyamide; 5–50 parts by weight of a modified rubber-like material (B) wherein 5–100 parts by weight of an aromatic vinyl compound is graft-polymerized with 100 parts by weight of a rubber-like material, the grafting ratio of said aromatic vinyl compound being 50% by weight or more; and 0.05–20% by weight of an α, β-unsaturated carboxylic acid or its derivative (C). The thermoplastic resin composition is excellent in impact resistance, in particular, impact resistance at room or low temperature, heat resistance and flexural modulus.

It has been unexpected from the prior viewpoint that a composition which is well-balanced and improved in terms of impact resistance, heat resistance and flexural modulus is obtained by mixing the above components together at a specific recipe.

Polyphenylene ether resin (A) used in the present invention is a polymer obtained, for example, by oxidation polymerization of one or more of phenol compounds having the formula:

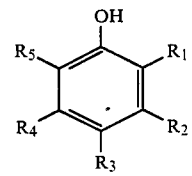

wherein $R_1$, $R_2$, $R_3$, $R_4$ and $R_5$ represent a hydrogen atom, a halogen atom or a hydrocarbon residue substituted or not and at least one of them is a hydrogen atom, with molecular oxygen or gas containing the same in the presence of an oxidation coupling catalyst.

Examples of $R_1$–$R_5$ are a hydrogen atom, a chlorine atom, a bromine atom, a fluorine atom and an iodine atom, a methyl group, an ethyl group, an n- or iso-propyl group, a pri.-, sec.- or tert.-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group, and an allyl group.

Examples of the phenol compound as shown in the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t.-butylphenol, thymol and 2-methyl-6-allylphenol. Alternatively, copolymer of any of the phenol compound listed above and the other phenol compound, for example, polyhydroxy aromatic compound, may be employed. The polyhydroxy aromatic compound is, for example, bisphenol A, tetrabromobisphenol A, resorcin, hydroquinone and novolack resin.

Preferably polymers are homopolymer of 2,6-dimethylphenol or 2,6-diphenylphenol and copolymers of a large amount of 2,6-xylenol and a small amount of 3-methyl-6-t-butylphenol or of 2,3,6-trimethylphenol.

Any oxydation coupling catalyst may be employed for oxydation polymerization of phenol compound, as long as it has polymerization ability. Examples are cuprous compound/tert. amine such as cuprous chloride/triethylamine and cuprous chloride/pyridine; cupric compound/amide/alkali metal hydroxide such as cupric chloride/pyridine/potassium hydroxide; manganese salt/primarly amine such as manganese chloride/ethanolamine and manganese acetate/ethylenediamine; manganese salt/alcolate or phenolate such as manganese chloride/sodium methylate and manganese chloride/sodium phenolate; and cobalt salt/tert. amine.

Polymerization temperature for preparing polyphenylene ether is 40° C. or higher (high temperature polymerization ) or lower (low temperature polymerization). Either temperature may be used, although polymers produced thereby have different properties.

Polyphenylene ether resin (A) further includes that grafted with styrenic polymer or other polymer. For instance, grafted one is obtained by graft-polymerizing styrene monomer and/or other comonomer in the presence of polyphenylene ether and organic peroxide [Japanese Patent Publications (Kokoku) 47 - 47862, 48 - 12197, 49 - 5623, 52 - 38596 and 52 - 30991]or by melt-kneading polyphenylene ether and polystyrene in the presence of a radical initiator [Japanese Patent Publication (Kokai) 52 - 142799].

The polyamides (A) used in the present invention may be those obtained by polycondensation of lactams of three or more membered rings, polymerizable ω-amino acids, dibasic acids with diamines, etc. As typical examples thereof, mention may be made of polymers of ε-caprolactam, aminocaproic acid, enantholactam, 7-aminoheptanoic acid, 11-aminoundecanoic acid, etc., polymers obtained by polycondensation of diamines such as hexamethylenediamine, nonamethylenediamine, undecamethylenediamine, dodecamethylenediamine, m-xylylenediamine, etc. with dicarboxylic acids such as terephtalic acid, isophthalic acid, adipic acid, sebacic acid, dibasic dodecanoic acid, glutaric acid, etc., or copolymers thereof.

Typical examples of said polyamides are aliphatic polyamides such as polyamide 6, polyamide 6,6, polyamide 6,10, polyamide 11, polyamide 12, polyamide 6,12, etc. and aromatic polyamides such as polyhexamethylenediamine terephthalamide, polyhexamethylenediamine isophthalamide, xylene group-containing polyamides, etc. These may also be used as mixtures or copolymers of two or more of them.

In the present invention, the resin composition (A) suitably comprises 5–95% by weight of polyphenylene ether and 95–5% by weight of polyamide. When polyamide is less than 5% by weight, solvent resistance and processability are not sufficiently improved and when polyamide is more than 95% by weight, thermal properties such as heat distortion temperature are deteriorated.

"Modified rubber-like material" in this invention means a rubber-like material which is modified with an aromatic vinyl compound.

"Rubber-like material" in this invention means natural and synthetic polymer materials which are elastic at room temperature.

As examples of the rubber-like materials, mention may be made of natural rubber, butadiene polymer, isoprene polymer, chlorobutadiene polymers, butadiene-acrylonitrile copolymer, isobutylene polymer, isobutylene-butadiene copolymer, isobutylene-isoprene copolymer, acrylate ester copolymer, Thiokol rubber, polysulfide rubber, polyurethane rubber, polyether rubber (e.g. polypropylene oxide), epichlorohydrin rubber, polyester elastomer, polyamide elastomer, etc.

These rubber-like materials may be produced by any methods (e.g., emulsion polymerization, solution polymerization, etc.) and with any catalysts (e.g., peroxides, trialkylaluminum, lithium halides, nickel catalysts).

Another preferable example of the rubber-like material is ethylene-α-olefin copolymer. The ethylene -α-olefin copolymer includes ethylene-α-olefin copolymer rubbers and ethylene-α-olefin-non-conjugated polyene copolymer rubber-like materials. The α-olefin of the ethylene-α-olefin copolymer is any of hydrocarbon compounds having 3–20 carbon atoms. Examples of the α-olefin are propylene, 1-butene, 1-pentene, 1-hexene, 1-heptene, styrene, p-isopropylstyrene and vinylcyclohexane, among which propylene is most important. Examples of non-conjugated polyene which is the third monomer of the ethylene-α-olefin-non-conjugated polyene copolymer, are 1,4-hexadiene, 1,6-octadiene, 2-methyl-1,5-hexadiene, 6-methyl-1,5-heptadiene, 7-methyl-1,6-octadiene, 11-ethyl-1,11-tridecadiene, 9-ethyl-1,9-undecadiene, isoprene, 1,4-pentadiene, 1,3-pentadiene, 1,4,9-decatriene, myrcene, 1-phenyl-1,3-butadiene, p-diallylbenzene, p-bromoallylbenzene, 4-vinyl-1-cyclohexene, 1,3,5-trivinylcyclohexane, trans-1,2-divinylcyclobutane, 1,5-cyclooctadiene, 1,3,5-cycloheptatriene, 1,5,9-cyclododecatriene, 1,4-cycloheptadiene, cyclopentadiene, dicyclopentadiene, 2,2'-dicyclopentenyl, 1,4-bis(cyclopenten-2-yl)butane, 4,7,3,9-tetrahydrindene, 6-methyl-4,7,8,9-tetrahydrindene, bicyclo(3,3,0)-octadiene-2,6-dicyclopentadiene, 2-methyl-2,5-norbornadiene, 5-methylene-2-norbornene, 5-ethylidene-2-norbornene, 5-isopropylidene-2-norbornene, 5-isopropenyl-2-norbornene, 5-(1',2'-dimethyl-1'-propenyl)-2-norbornene, 5-(2'-butenyl)-2-norbornene, 6-methyl-5-(2'-butenyl)-2-norbornene, 6-(3'-cyclohexenyl)-2-norbornene, tricyclopentadiene, 6-chloromethyl-5-isopropenyl-2-norbornene, etc.

The ethylene-α-olefin-non-conjugated polyene copolymer used in this invention may be known one which comprises 40–90 mol.% of ethylene, 10–60 mol.% of α-olefin and 0.3–20 mol.% of non-conjugated polyene, preferably 49–85 mol.% of ethylene, 15–35 mol.% of α-oleifin and 1–10 mol.% of non-conjugated polyene. If anethylene-α-olefin-non-conjugated polyene copolymer in which the content of non-conjugated polyene is 20 mol.% or more is used as a component of the composition, undesirable gelled substances increase in the composition.

In the present invention, modification of the rubber-like material is carried out by graft-copolymerizing at least one of the following aromatic vinyl compounds with the rubber-like material.

The aromatic vinyl compounds to be grafted are shown by the following formula:

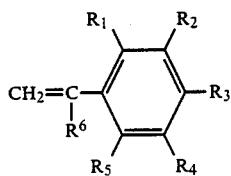

wherein $R_1$, $R_2$, $R_3$, $R_4$ and $R_5$ represent a hydrogen atom, a halogen atom, a substituted or unsubstituted hydrocarbon residue or a substituted or unsubstituted hydrocarbonoxy residue, and $R_6$ represents a hydrogen atom or a lower alkyl group having 1–4 carbon atoms. Examples of $R_1$, $R_2$, $R_3$, $R_4$ and $R_5$ of the above formula are hydrogen; halogen atoms such as chlorine, bromine and iodine; unsubstituted hydrocarbon residues such as methyl, ethyl, propyl, vinyl, allyl, benzyl and methyl benzyl; substituted hydrocarbon residues such as chloromethyl and bromomethyl; and substituted or unsubstituted hydrocarbonoxy residues such as methoxy, ethoxy, phenoxy and monochloromethoxy. Examples of $R_6$ are hydrogen, and lower alkyl groups such as methyl and ethyl.

Examples of the aromatic vinyl compounds are styrene monomer, 2,4-dichlorostyrene, p-methoxystyrene, p-methylstyrene, p-phenylstyrene, p-divinylbenzene, p-(chloromethoxy)-styrene, α-methylstyrene, o-methyl-α-methylstyrene, m-methyl-α-methylstyrene, p-methyl-α-methylstyrene, and p-methoxy-α-methylstyrene. They are used singly or in a mixture of at least two of them.

Any of known polymerization processes such as suspension polymerization, emulsion polymerization, solution polymerization and bulk polymerization including a method using an extruder as well as a method using a polymerization vessel, is employed to graft-polymerize the aromatic vinyl compound with the rubber-like material. For the graft-polymerization, 5–100 parts by weight of aromatic vinyl compound is used based on 100 parts by weight of rubber-like material. If less than 5 parts by weight of aromatic vinyl compound is used, compatibility between polyphenylene ether resin and modified rubber-like material and dispersibility are deteriorated and thus impact resistance, heat resistance and flexural modulus are not sufficiently obtained. On the other hand, if more than 100 parts by weight of aromatic vinyl compound is used, ungrafted homopolymer of aromatic vinyl compounds that is compatible with polyphenylene ether is excessively produced during the graft-polymerization, and thus heat resistance of the resulting polyphenylene ether/polyamide composition is deteriorated. It is essential that the grafting ratio of aromatic vinyl compound as calculated below:

$$\left(\begin{array}{c}\text{Grafting}\\\text{ratio}\end{array}\right) = \frac{\left(\begin{array}{c}\text{the total amount}\\\text{of polystyrene}\end{array}\right) - \left(\begin{array}{c}\text{amount of}\\\text{homopolystyrene}\end{array}\right)}{\text{(the total amount of polystyrene)}}$$

is 50% by weight or more. If the grafting ratio is less than 50% by weight, compatibility between polyphenylene ether resin and modified rubber-like material is deteriorated, and thus impact resistance is degraded and phase separation of injection-molded articles becomes easy to occur.

An addition amount of the modified rubber-like material (B) is preferably 5–50 parts by weight based on 100 parts by weight of the mixture (A) of polyphenylene ether and polyamide. If it is less than 5 parts by weight, impact resistance is not sufficiently improved. If 50 parts by weight or more, impact strength becomes very high, but heat resistance is deteriorated.

In general, such rubber-like materials as butadiene polymer, styrene-butadiene copolymer, styrene-butadiene-styrene block copolymer and acrylonitrile-butadiene copolymer are not preferred since the butadiene component of them causes thermal degradation and thus considerably lowers impact resistance at high temperature.

The present modified rubber-like materials wherein an aromatic vinyl compound is graft-polymerized is excellent in compatibility with polyphenylene ether resin and dispersibility and low in the deterioration of impact resistance resulting from thermal degradation at high temperature.

The α,β-unsaturated carboxylic acid or its derivative (C) used in the present invention includes maleic anhydride, maleic acid, chloromaleic anhydride, maleimide, N-aromatic maleimide, N-aliphatic maleimide, acrylic acid, methacrylic acid, acrylamide, methacrylamide, itaconic acid, itaconic acid anhydride, crotonic acid, methyl acrylate, ethyl acrylate, butyl acrylate, methyl methacrylate, ethyl methacrylate, butyl methacrylate, glycidyl acrylate (GA), glycidyl methacrylate (GMA), etc.

In addition to α,β-unsaturated carboxylic acid or its derivative, the component (C) of the present invention includes the following compounds. That is, (i) oxazoline, (ii) a compound which has in its molecule, (a) carbon-carbon double bond or carbon-carbon triple bond and (b) at least one functional group selected from carboxyl group, acid anhydride, amino group, acid amide group, imido group, epoxy group, carboxylic acid ester group, isocyanate group, methylol group, oxazoline and hydroxyl group. Examples of these compounds are methylnadic anhydride, and, natural fats and oils such as soybean oil, tung oil, caster oil, linseed oil, hempseed oil, cottonseed oil, sesame oil, rapeseed oil, peanut oil, camellia oil, olive oil, coconut oil and sardine oil; epoxided natural fats and oils such as epoxided soybean oil; unsaturated carboxylic acid such as butenoic acid, vinyl acetic acid, pentenoic acid, 3-pentenoic acid, 4-pentenoic acid, 2,2-dimethyl-3-butenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 9-octadecenoic acid, eicosenoic acid, docosenoic acid, erucic acid, tetracocenoic acid, diallyl acetic acid, 9,12-hexadecadienic acid, 9,12-octadecadienic acid, hexadecatrienic acid, linolic acid, linolenic acid, octadecatrienic acid, eicosadienic acid, eicosatrienic acid, eicosatetraenic acid, ricinoleic acid, eleosteric acid, oleic acid, eicosapentaenoic acid, erucic acid, docosadienic acid, docosatrienic acid, docosatetraenic acid, docosapentaenic acid, tetracosenoic acid, hexacosenoic acid, hexacodienoic acid, octacosenoic acid, and tetraaconitic acid; and ester, acid amide or anhydride of unsaturated carboxylic acid above.

Suitable examples of the acid anhydrides are 4-methylcyclohexa-4-ene-1,2-dicarboxylic acid anhydride (4-MTHPA). 1,2,3,4,5,8,9,10-octahydronaphthalene-2,3-dicarboxylic acid anhydride, bicyclo(2,2,2)octa-5-ene-2,3-dicarboxylic acid anhydride (BODA), bicyclo(2,2,1)-octa-7-ene-2,3,5,6-tetracarboxylic acid- 2,3,5,6-dianhydride, maleo-pimaric acid(M-PA), bicyclo(2,2,1)hepta-5-ene-2,3-dicarboxylic acid anhydride (NBDA), X-methylbicyclo(2,2,1)hepta-5-ene-2,3-dicarboxylic acid anhydride (XMNA), and 7-oxabicyclo(2,2,1)hepta-5-ene-2,3-dicarboxylic acid anhydride.

Further examples of the (C) are unsaturated alcohol such as allyl alcohol, crotyl alcohol, methyl-vinyl carbinol, allyl carbinol, methylpropenyl carbinol, 4-penten-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohol of the formula: $C_nH_{2n-3}OH$, $C_nH_{2n-7}OH$ or $C_nH_{2n-9}OH$ (n is an integer), 3-butene-1,2-diol, 2,5-dimethyl-3-hexene-2,5-diol, 1,5-hexadiene-3,4-diol or 2,6-octadiene-4,5-diol; unsaturated amine such as that where an OH group of the unsaturated alcohol is replaced by an $—NH_2$ group; and allylglycidyl ether.

Suitable examples of the (C) are maleic anhydride, maleic acid, fumaric acid, itaconic acid, glycidyl acrylate, glycidyl methacrylate and allylglycidyl ether.

Addition amount of the (C) is preferably 0.05-20 parts by weight. If out of this range, impact strength is not sufficiently improved.

Additives normally used in this field such as heat stabilizer, fire retardant, pigment, filler, lubricant, ultraviolet absorber, etc., may be added to the present thermoplastic resin composition. Fiber reinforcements such as glass fiber, asbestos fiber, carbon fiber, aluminum fiber, etc., may also be added.

Any process is used to prepare the present resin composition.

Melt-blending methods for the components are the best from an economical point of view, although it is possible to blend the components in a solution and evaporate the solvent or precipitate in a non-solvent. Melt-blending is carried out in a single-screw or a twin-screw extruder, a kneader or so, preferably a high-speed twin-screw extruder.

Before kneading, it is preferable to uniformly blend powder or pellets of the component resins in a tumbler or a Henschel mixer. The first blending above is not always necessary. Alternatively, each resin may be fed to a kneader through a metering apparatus.

Resin composition, after kneaded, is molded according to injection, extrusion and the like. Alternatively, dry-blending the resin components at the injection or extrusion molding without pre-kneading and directly kneading them are made in the melt processing to produce a shaped article.

Any order is used in the kneading step. For example, compounds for (A), (B) and (C) are kneaded together, or compounds for (A) and (B) are first kneaded before (C) is added. Alternatively, polyphenylene ether resin and compounds for (B) and (C) are first kneaded, and polyamide resin is added. Any other orders may be used for kneading the components.

This invention is explained referring to examples below, wherein they are merely illustrative ones and this invention is not limited to them. M.I., heat distortion temperature test (H.D.T.), Isod impact strength test (3.2 mm thick) and flexural modulus (3.2 mm thick) are observed in accordance with JIS K7210, JIS K7207, JIS K7110 and JIS K7203, respectively.

Polyphenylene ether, styrene grafted ethylenepropylene rubber and styrene grafted isoprene rubber used in the examples and comparative examples were obtained in the following manner. As maleic anhydride and polyamide, commercially available ones were used.

A preparation of Polyphenylene Ether

In an autoclave of 10 l in capacity with jacket which is provided with a stirrer, a thermometer, a condenser and an air introducing pipe which reaches the bottom of the autoclave to make a homogeneous solution,, are charged 3,420 g of xylene, 1,366 g of methanol, 1,222 g (10 mols) of 2,6-dimethylphenol and 24 g (0.6 mol) of sodium hydroxide. Thereafter, to the solution is added a solution prepared by dissolving 31.5 g (0.3 mol) of diethanolamine, 19.4 g (0.15 mol) of di-n-butylamine and 0.99 g (0.005 mol) of manganese chloride tetrahydrate. Then, while vigorously stirring the content, air is blown thereinto at a rate of 5 l/min. Reaction temperature and pressure are maintained at 35° C. and 9 kg/cm$^2$, respectively. The supply of air is stopped after lapse of 7 hours from the beginning of introduction and the reaction mixture is thrown into a mixture of 66 g (1.15 mol) of acetic acid and 4,900 g of methanol. The resulting slurry is filtered under reduced pressure to isolate wet polyphenylene ether. The isolated polyphenylene ether is washed with 7,200 g of methanol and then dried under reduced pressure at 150° C. overnight to obtain 1,179 g of dried polyphenylene ether, which has a reduced viscosity of 0.54 dl/g measured in chloroform of 0.5 g/dl at 25° C.

Preparation A of modified rubber-like material

In a 1.0 liter glass autoclave, are put 100 grams of pelletized ethylene-propylene copolymer (ESPREN ® E-120P manufactured by Sumitomo Chemical Co., Ltd.) and 350 grams of water, and while stirring, are added thereto a solution of 0.75 gram benzoyl peroxide in 70 grams of styrene and a solution of 4.0 grams polyvinyl alcohol (GOSENOL GL-05 Manufactured by Nihon Gosei Kagaku Kogyo Kabushiki Kaisha) as dispersion stabilizer in 100 grams of water, in order. The mixture is subsequently stirred for one hour to render the pelletized ethylene-propylene copolymer impregnated with the solutions. Then, the reaction is allowed at 90° C. for 6 hours and at 115° C. for 2 hours. After the reaction is over, the reaction product is filtered, washed with water and vacuum-dried to obtain 157 grams of pellets of modified rubber-like material.

Preparation B of modified rubber-like material

In 1.0-liter glass autoclave, are put 100 grams of the same pelletized ethylene-propylene copolymer as in the preparation A and 350 grams of water, and while stirring, are added thereto a solution of 0.65 gram benzoyl peroxide in 30 grams of styrene and a solution of 4.0 grams of the same polyvinyl alcohol used in the preparation A in 100 grams of water, in order. The impregnation and the reaction are conducted in the same manner as in the preparation A. After the reaction is over, the reaction product is filtered, washed with water and vacuum-dried to obtain 125 grams of pellets of modified rubber-like material.

Preparation C of modified rubber-like material

In a 1.0-liter glass autoclave, are put 100 grams of ethylene-propylene-dicyclopentadiene terpolymer (ESPRENE ® E-306 manufactured by Sumitomo Chemical Co., Ltd.) which has been ground into 5 mm or less cubic particles and 350 grams of water, and while stirring, are added thereto a solution of 0.65 grams of benzoyl peroxide in 30 grams of styrene and a solution of 4.0 grams of the same polyvinyl alcohol as in the preparation A in 100 grams of water, in order. The impregnation and the reaction are conducted in the same conditions as in the preparation A. After the reaction is over, the reaction product is filtered; washed with water and vacuum-dried to obtain 127 grams of pellets of modified rubber-like material.

Preparation D of modified rubber-like material

One hundred and fifty seven grams of pellets of modified rubber-like material is obtained in the same manner as in the preparation A except that the temperature and the period when styrene is graft-polymerized are at 70° C. and for 6 hours.

Table 1 shows the analysis data of the modified rubber-like materials prepared in the preparations A, B, C and D.

TABLE 1

| Preparation | Content of polystyrene components in modified rubber-like material (%) | (1) Content of homopoly-styrene (%) | (1) Grafing ratio (%) |
|---|---|---|---|
| A | 36 | 43 | 57 |
| B | 20 | 33 | 67 |
| C | 21 | 20 | 80 |
| D | 36 | 70 | 30 |

(1) measured by extracting homopolystyrene with methylethylketone

Content of homopolystyrene = $\frac{\text{An amount of homopolystyrene}}{\text{The total amount of polystyrene}}$ Grafting ratio = $\frac{\text{The total amount of polystyrene} - \text{an amount of homopolystyrene}}{\text{The total amount of polystyrene}}$

EXAMPLE 1

The above-described polyphenylene ether, the styrene grafted ethylene-propylene rubber prepared in the preparation C (which is hereinafter referred to as "styrene grafted EP rubber C") and maleic anhydride were put into a twin-screw kneader ("TEX-44" ® of Nihon Seikosho) through its first hopper. And, polyamide 6 (UNITIKA Nylon 6 ® 1030BRL) was put into the kneader through its second hopper located between the first hopper and its air vent.

The polyphenylene ether was 50% by weight, the styrene grafted EP rubber C was 10% by weight and the polyamide 6 was 40% by weight, of the total of the three components. 0.6 part by weight of the maleic anhydride was used based on 100 parts by weight of the total of the three components.

These materials were kneaded at a cylinder temperature of 260° C. at screw rotation of 380 rpm and then pelletized.

After the resulting composition had been dried, it was molded into test specimens with an injection molding machine (Toshiba IS-150EV Type) at a set temperature of 290° C. and at a die temperature of 80° C.

The results are shown in Table 2.

COMPARATIVE EXAMPLE 1

Experiment was conducted in the same manner as in Example 1 except that styrene grafted ethylene propylene rubber was replaced with ethylene propylene rubber (EP rubber).

COMPARATIVE EXAMPLE 2

Experiment was conducted in the same manner as in Example 1 except that no maleic anhydride was used.

The results of comparative examples 1 and 2 are shown in Table 2.

The mouldings of comparative example 1 presented phase separation around the gate.

It is understood from Example 1 and Comparative Example 1 that styrene grafted ethylene propylene rubber is superior to ethylene propylene rubber for stabilizing the phase and balancing the properties. It is found from Comparative Example 2 that if maleic anhydride is not used, impact strength considerably degrades. These results ensure the good effect of the present invention.

EXAMPLE 2

Experiment was conducted in the same manner as in Example 1 except that styrene grafted EP rubber C was replaced with styrene grafted EP rubber B.

The results were shown in Table 2.

EXAMPLE 3

Experiment was conducted in the same manner as in Example 1 except that styrene grafted EP rubber C was replaced with styrene grafted EP rubber A.

The results were shown in Table 2.

It is found from Examples 1, 2 and 3 that impact resistance depends on polystyrene content and that the higher the polystyrene content is, the lower the impact strength is. In view of these results, the polystyrene content is preferably 40% by weight or less, and more preferably 20% by weight or less.

EXAMPLES 4 and 5

Experiments were conducted in the same manner as in Example 1 except that 45% by weight of polyphenylene ether and 15% by weight of stryene grafted EP rubber C were used in Example 4 and that 55% by weight of polyphenylene ether and 5% by weight of styrene grafted EP rubber C were used in Example 5.

COMPARATIVE EXAMPLE 3

Experiment was conducted in the same manner as in Example 1 except that 58% by weight of polyphenylene ether and 2% by weight of styrene grafted EP rubber C were used.

The results of Examples 4 and 5 and Comparative Example 3 were shown in Table 2.

It is understood from the results of Examples 1, 4 and 5 and Comparative Example 3 that the content of styrene grafted ethylene propylene rubber is preferably 5% by weight based on the composition.

COMPARATIVE EXAMPLE 4

Experiment was conducted in the same manner as in Example 1 except that styrene grafted EP rubber C was replaced with styrene-butadiene-styrene block copolymer rubber (TAFPLENE ® KR).

As shown in Table 2, the results concerning properties of Comparative Example 4 is substantially the same as Example 1. However, as shown in Table 3, its heat stability is considerable degraded.

COMPARATIVE EXAMPLE 5

Experiment was conducted in the same manner as in Example 1 except that styrene grafted EP rubber C was replaced with styrene grafted EP rubber D.

The results concerning properties are shown in Table 2.

EXAMPLE 6

Experiment was conducted in the same manner as in Example 1 except that maleic anhydride was replaced with glycidyl methacrylate.
The results are shown in Table 4.

EXAMPLE 7

Experiment was conducted in the same manner as in Example 1 except that maleic anhydride was replaced with itaconic acid.
The results are shown in Table 4.

EXAMPLE 8

Experiment was conducted in the same manner as in Example 1 except that maleic anhydride was replaced with fumaric acid.
The results are shown in Table 4.

EXAMPLE 9

Experiment was conducted in the same manner as in Example 1 except that maleic anhydride was replaced with allylglycidyl ether.
The results are shown in Table 4.

TABLE 2

| | Composition | | | |
|---|---|---|---|---|
| | Polyphenylene ether wt % | Modified rubber-like material wt % | Maleic anhydride Part by weight | Nylon 6 wt % |
| Example 1 | 50 | Styrene grafted EP rubber (C) 10 | 0.6 | 40 |
| Comparative Example 1 | 50 | EP rubber 10 | 0.6 | 40 |
| Comparative Example 2 | 50 | Styrene grafted EP rubber (C) 10 | — | 40 |
| Example 2 | 50 | Styrene grafted EP rubber (B) 10 | 0.6 | 40 |
| Example 3 | 50 | Styrene grafted EP rubber (A) 10 | 0.6 | 40 |
| Example 4 | 45 | Styrene grafted EP rubber (C) 15 | 0.6 | 40 |
| Example 5 | 55 | Styrene grafted EP rubber (C) 5 | 0.6 | 40 |
| Comparative Example 3 | 58 | Styrene grafted EP rubber (C) 2 | 0.6 | 40 |
| Comparative Example 4 | 50 | Styrene-butadiene-styrene copolymer rubber 10 | 0.6 | 40 |
| Comparative Example 5 | 50 | Styrene grafted EP rubber 10 | 0.6 | 40 |

| | M.I. 280° C., 10 kg load (g/10 min.) | Izod impact strength (notched) 23° C. kg·cm/cm | Izod impact strength (notched) −30° C. kg·cm/cm | H.D.T. (18.6 kg/cm$^2$) °C. | Flexural modulus kg/cm$^2$ |
|---|---|---|---|---|---|
| Example 1 | 42 | 50 | 15 | 135 | 22200 |
| Comparative Example 1 | 37 | 52 | 13 | 111 | 20800 |
| Comparative Example 2 | 57 | 6 | 4 | 132 | 22000 |
| Example 2 | 53 | 45 | 11 | 132 | 22200 |
| Example 3 | 49 | 26 | 9 | 125 | 23500 |
| Example 4 | 48 | 63 | 15 | 121 | 20500 |
| Example 5 | 39 | 10 | 6 | 149 | 25200 |
| Comparative Example 3 | 41 | 6 | 4 | 150 | 26100 |
| Comparative Example 4 | 30 | 52 | 15 | 130 | 21500 |
| Comparative Example 5 | 50 | 10 | 5 | 125 | 22000 |

TABLE 3

| | Composition | | | | Impact strength after residing in injection molding machine (290° C.) | | 200° C. heat degradation test | |
|---|---|---|---|---|---|---|---|---|
| | Polyphenylene ether wt % | Modified rubber-like material wt % | Maleic anhydride Part by weight | Nylon 6 wt % | No residence Izod impact (23° C.) kg·cm/cm | After residing for 5 minutes Izod impact (23° C.) kg·cm/cm | Before degraded Izod impact (23° C.) kg·cm/cm | Degraded for 8 hrs. Izod impact (23° C.) kg·cm/cm |
| Example 1 | 50 | Styrene grafted EP rubber (C) 10 | 0.6 | 40 | 50 | 45 | 50 | 40 |
| Comparative Example 4 | 50 | Styrene-butadiene- | 0.6 | 40 | 52 | 22 | 52 | 21 |

TABLE 3-continued

| Composition | | | | Impact strength after residing in injection molding machine (290° C.) | | 200° C. heat degradation test | |
|---|---|---|---|---|---|---|---|
| Polyphenylene ether wt % | Modified rubber-like material wt % | Maleic anhydride Part by weight | Nylon 6 wt % | No residence Izod impact (23° C.) kg · cm/cm | After residing for 5 minutes Izod impact (23° C.) kg · cm/cm | Before degraded Izod impact (23° C.) kg · cm/cm | Degraded for 8 hrs. Izod impact (23° C.) kg · cm/cm |
| | styrene copolymer rubber 10 | | | | | | |

TABLE 4

| | Composition | | | |
|---|---|---|---|---|
| | Polyphenylene ether wt % | Modified rubber-like material wt % | Component (C) Part by weight | Nylon 6 wt % |
| Example 6 | 50 | Styrene grafted EP rubber (C) 10 | Glycidyl methacrylate 0.6 | 40 |
| Example 7 | 50 | Styrene grafted EP rubber (C) 10 | Itaconic acid 0.6 | 40 |
| Example 8 | 50 | Styrene grafted EP rubber (C) 10 | Fumaric acid 0.6 | 40 |
| Example 9 | 50 | Styrene grafted EP rubber (C) 10 | Allyl glycidyl ether 0.6 | 40 |

| | M.I. (280° C., 10 kg load) g/10 min. | Izod impact strength (notched) | | H.D.T. (18.6 kg/cm$^2$) °C. | Flexural molules kg/cm$^2$ |
|---|---|---|---|---|---|
| | | 23° C. kg · cm/cm | −30° C. kg · cm/cm | | |
| Example 6 | 29 | 43 | 11 | 120 | 21000 |
| Example 7 | 35 | 30 | 9 | 125 | 22000 |
| Example 8 | 30 | 45 | 12 | 126 | 21500 |
| Example 9 | 25 | 41 | 10 | 123 | 20800 |

The resin composition of this invention comprises a composition comprising a polyphenylene ether and a polyamide, with which are combined a specific amount of a modified rubber-like material wherein an aromatic vinyl compound is graft-polymerized with a rubber-like material and a specific amount of α, β-unsaturated carboxylic acid or its derivative. The composition has a remarkably-improved impact resistance, an improved heat resistance and flexural modulus, and a good processability so as to be applied to a wide range of uses.

Further, the novel resin composition provided by this invention is easily processed into shaped articles, sheets and films by molding methods employed for thermoplastic resins such as injection molding, extrusion molding, etc., said molded products being balance of properties such as impact resistance, heat resistance, flexural rigidity, etc. This resin composition is especially suitable for injection molding.

We claim:

1. A thermoplastic resin composition which comprises
   100 parts by weight of a composition (A) which comprises 5-95% by weight of a polyphenylene ether resin and 95-5% by weight of a polyamide,
   5-50 parts by weight of a modified rubber-like material (B) wherein 5-100 parts by weight of an aromatic vinyl compound is graft-polymerized with 100 parts by weight of a rubber-like material, the grafting ratio of the aromatic vinyl compound being 50% by weight or more, and
   0.05-20 parts by weight of an α, β-unsaturated carboxylic acid or its derivative (C).

2. A thermoplastic resin composition according to claim 1 wherein said aromatic vinyl compound is styrene monomer.

3. A thermoplastic resin composition according to claim 1 wherein said rubber-like material (B) is ethylene-α-olefin copolymer.

4. A thermoplastic resin composition according to claim 3 wherein said ethylene-α-olefin copolymer is ethylene-propylene copolymer or ethylene-propylene-non-conjugated polyene copolymer.

5. A thermoplastic resin composition according to claim 2 or 3 wherein said modified rubber-like material (B) is one in which 10-70 parts by weight of stryrene monomer is graft-polymerized with 100 parts by weight of ethylene-α-olefin copolymer.

6. A thermoplastic resin composition according to claim 2 or 3 wherein said modified rubber-like material (B) is one in which 25-45 parts by weight of styrene monomer is graft-polymerized with 100 parts by weight of ethylene-α-olefin copolymer.

7. A thermoplastic resin composition according to claim 1 wherein said α, β-unsaturated carboxylic acid or its derivative (C) is maleic anhydride or maleic acid.

8. A thermoplastic resin composition according to claim 1 wherein said modified rubber-like material (B) is 5-30 parts by weight based on 100 parts by weight of said composition (A).

* * * * *